May 3, 1966   C. R. WUELLNER   3,249,021
POWER BRAKE BOOSTER
Filed Oct. 4, 1963   2 Sheets-Sheet 1
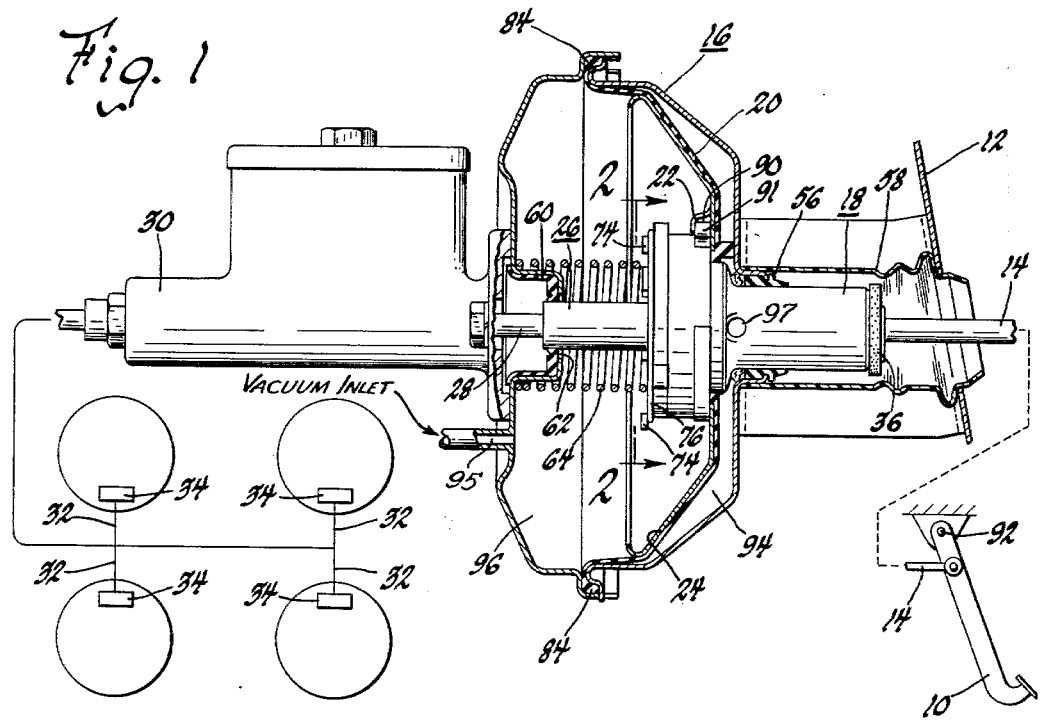
Fig. 1
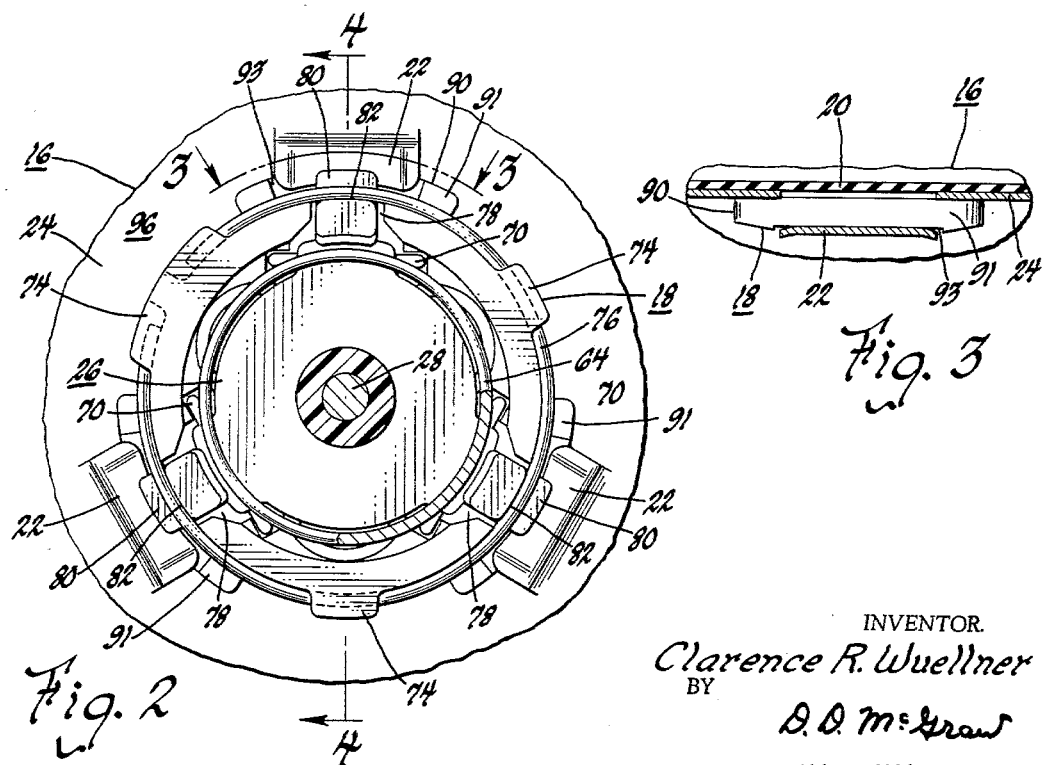
Fig. 2
Fig. 3
INVENTOR.
Clarence R. Wuellner
BY
D. D. McGraw
HIS ATTORNEY May 3, 1966

C. R. WUELLNER 3,249,021

POWER BRAKE BOOSTER

Filed Oct. 4, 1963

INVENTOR.
Clarence R. Wuellner
BY
D. D. McGraw
HIS ATTORNEY

United States Patent Office 3,249,021
Patented May 3, 1966

3,249,021
POWER BRAKE BOOSTER
Clarence R. Wuellner, Dayton, Ohio, assignor to General Motors Corporation, Detroit, Mich., a corporation of Delaware
Filed Oct. 4, 1963, Ser. No. 314,045
8 Claims. (Cl. 91—369)

This invention relates to power braking systems and more particularly to an improved power head assembly for a power brake booster.

In the manufacture of power brake boosters, a problem exists during the assembly of said boosters that is caused, in part, by the numerous parts that must be assembled into a power head and, in part, due to the assembling of a power wall and a housing therefor. The difference in the types of materials used in the power wall and in a housing dictate their manufacture in differenct parts of a plant or, even sometimes, in different plants. Therefore, it is desirable to manufacture a power wall and valving therefor as a subassembly for assembly later to a housing and other related components.

It is an object of the present invention to provide means for maintaining a power wall and associated valving in assembled relationship prior to final assembly.

It is another object of the present invention to provide means that will hold the power wall and associated valving in assembled disposition during the manufacture thereof and will serve to hold the same parts in operative engagement during the functioning of the assembled device.

It is still another object of the present invention to provide improved means for attaching a diaphragm having a diaphragm support to a power piston.

It is a further object of the present invention to provide resilient means for attaching a power piston to a reaction retainer without the necessity for expensive and intricate assembly machines.

It is still a further object of the present invention to provide a method of assembling the power portion of a vacuum suspended power head that will prevent and random rotational or axial movement between the parts comprising said assembly.

Further objects and advantages of the present invention will be apparent from the following description, reference being had to the accompanying drawings wherein a preferred embodiment of the present invention is clearly shown.

In the drawings:

FIGURE 1 illustrates a typical power braking system with the power booster assembly being shown partially in section;

FIGURE 2 is a sectional view taken along line 2—2 of FIGURE 1;

FIGURE 3 is a section taken along line 3—3 of FIGURE 2;

Figure 4:
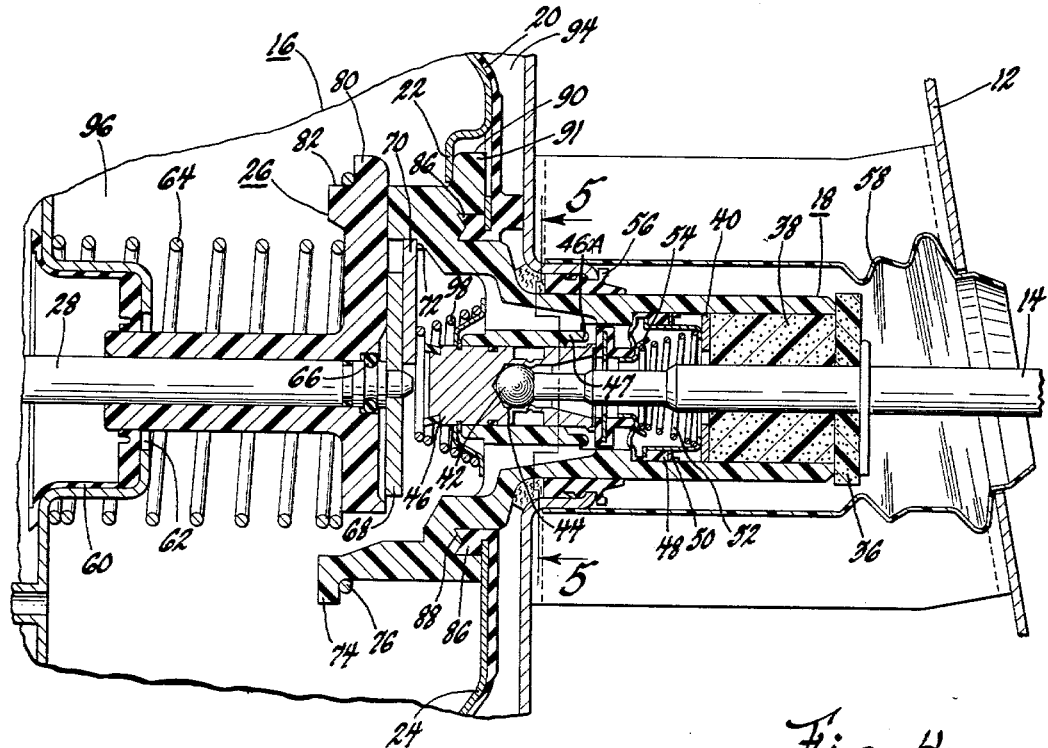
FIGURE 4 is a sectional view taken along line 4—4 of FIGURE 2.

Referring now to FIGURE 1, a brake pedal 10 is suspended, in any fashion well known in the art, on one side of a fire wall 12 of an automobile, not shown, and arranged to move a piston rod 14 in a reciprocative manner relative to a power booster 16. A power piston 18 engages one end of the piston rod 14 through a valving arrangement to be hereinafter described. The power piston 18 likewise engages a diaphragm 20 through a series downwardly projecting flanges 22 formed on one face of a diaphragm support 24. The power piston 18 also engages a reaction retainer 26 in a manner that will be hereinafter described. The reaction retainer 26 carries a push rod 28 disposed for sliding movement therein, said push rod being operatively associated with a hydraulic master cylinder 30 to displace hydraulic fluid through a plurality of lines 32 to a series of brakes 34.

Referring now to FIGURE 4, the piston rod 14 passes through a silencer 36 and an air filter 38 that together form a closure means for one end of the power piston 18. A washer 40 retains the air filter 38 and silencer 36 in their operative location. A piston rod 14 has a ball end 42 received in a pocket 44 of an air valve 46. The air valve 46 is adapted for sliding movement through one portion of the power piston 18 and is arranged to meter the flow of air to one side of the diaphragm 20.

It should be noted that, in the embodiment shown, the power head is vacuum suspended and, therefore, the functioning thereof involves the metering of atmospheric air to one side of the diaphragm. A floating valve 48 engages an inside wall of the power piston 18 and is held in its operative position by a retainer 50. Another portion of the floating valve 48 is maintained in engagement with the air valve 46 by a spring 52 and a cup 54.

A piston bearing 56 engages a wall of the power booster 16 and provides a sleeve through which the power piston slides. The valving means previously described and the operative portions of the power booster associated with the piston rod 14 are enclosed by a resilient boot 58.

The reaction retainer 26 is disposed for sliding movement through a front housing seal 60, said seal being positioned around an output port 62 of the power booster housing 16. The reaction retainer 26 is biased rightwardly, as viewed in FIGURE 4, by a power piston spring 64. The push rod 28 is adapted for sliding movement within the reaction retainer and has a retaining ring 66 provided to prevent movement of said push rod in one direction during assembly thereof.

A lever reaction plate 68 fits around a portion of the push rod 28 and serves to provide a mechanical link between the power wall assembly and the push rod 28 during operation of said booster. Reaction levers 70 are disposed against one edge of the lever reaction plate 68 and a flange 72 of the power piston to provide a "feel" during operation of the power booster.

Referring now to FIGURE 2, the power piston 18 has a series of outwardly projecting flanges 74 spaced on one side of a plane defined by a lock ring 76 operatively positioned. The power piston has a series of pockets 78 arranged to receive a series of outwardly projecting lugs 80 formed on an edge of the reaction retainer 26. The outwardly projecting lugs 80 have step portions 82 arranged to contact the lock ring 76, the lock ring 76 contacting the step portions at the apex of the angle forming the step. The relationship of parts is such that the thickness of the lower step of the lug is substantially equal to the distance from one edge of the lock ring 76 to the base of the pocket 78. Therefore, it is readily seen that, as the projecting lugs 80 are moved, during assembly, into the pockets 78 and the lock ring 76 is installed against the projecting flanges 74, the reaction retainer that carries the lugs 80 is held in firm engagement with the power piston 18.

Referring now to FIGURE 1, the diaphragm 20 has a bulb portion 84 pressed between two cooperating flanges of the power booster housing 16 whereby the diaphragm 20 is circumferentially engaged and therefore held in its operative position in engagement with the housing. The diaphragm support 24 is arranged on one side of the diaphragm 20 in contiguous relationship thereto to support the diaphragm and also serves to retain the diaphragm in operative engagement with the power piston. This engagement must of necessity be pressure-tight and this result is brought about by a series of hooked flanges 22 circumferentially positioned around the inside perimeter of the diaphragm support 24. On its inner edge, the diaphragm 20 has a projecting portion 86 adapted to be received in a pocket 88 on one face of the power piston 18. The diaphragm support 24 presses the projecting portion 86 into the pocket 88 and firmly attaches the diaphragm 20 to the power piston 18 by the engagement of the flanges 22 with an outer rim 90 of the power piston 18. The precise manner of engagement of the flange 22 is best seen in FIGURE 3.

Referring now to FIGURE 3, the outer rim 90 is composed of a series of lugs 91, each one of which has a depression 93 therein. The flanges 22 of the diaphragm support 24, during assembly, are turned so that the depression 93 is engaged by one of the flanges. The edges of the depression 93 prevent the associated flange from being accidentally dislodged from its mounted position. This manner of engagement allows the power piston to be operatively engaged to the diaphragm without the use of any fastening means other than the integral flanges 22.

Referring now to FIGURE 1, in operation, the brake pedal 10 is pushed and pivoted around a pivot 92 which causes the piston rod 14 to be moved in a leftward direction as viewed in FIGURES 1 and 4.

Figure 5:
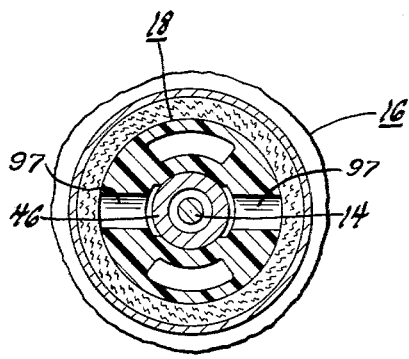
FIGURE 5 is a sectional view taken along line 5—5 of FIGURE 4.

Referring now to FIGURE 4, the movement of the piston rod 14, through its engagement with the air valve 46, causes the air valve to slide in a leftward direction. This movement of the air valve 46 permits the floating valve 48 under compression of the spring 52 to close a vacuum valve 47 through which vacuum is maintained in chamber 94. Vacuum is supplied through an inlet 95 into chamber 96. Chamber 96 communicates with chamber 94 through passages 97, better seen in FIGURE 5. Further air valve movement disengages the portion 46A of the air valve making contact with the floating valve and allows atmospheric pressure to bleed past the two opposed surfaces into a variable pressure chamber 94 atmospheric pressure being always present around the push rod 14. The portion of the chamber on the opposite side of the diaphragm 20 will hereinafter be referred to as the evacuated chamber 96.

It should be noted that the evacuated chamber 96 has a vacuum inlet line 95 which constantly keeps the chamber 96 at a reduced pressure. The variable pressure chamber 94 is likewise vacuum charged during the static condition but has atmospheric air bled into it during operation of the brake power booster. It should also be noted that the power booster herein described forms no part of the present invention except as certain described elements structurally coact utilizing the subject invention.

Referring again to FIGURE 4, as atmospheric air bleeds into the chamber 94, the diaphragm and the power piston engaging said diaphragm are moved in a leftward direction as viewed in FIGURE 4. This movement carries the floating valve into reengagement with the air valve 46 and shuts off the air bleeding into the chamber 94 as well as vacuum charging the chamber 96 as the vacuum valve 47 is opened. The forward movement of the power piston previously described carries the reaction retainer 26 in a leftward direction as viewed in FIGURE 4 against the tension of the spring 64. The push rod 28, being in free slidable engagement with the reaction retainer 26, has a tendency to remain where it is due to the reaction against the output end of the push rod by the pressurized hydraulic fluid in the hydraulic master cylinder 30. Therefore, the lever reaction plate 68 will tend to remain stationary until the movement of the power piston in a leftward direction causes the flange 72 to push against the outer edge of the reaction levers 70, pivoting said reaction lever on the edge of the lever reaction plate 68 against the force of the reaction spring 98. This levering action will cock the inner edge of the reaction levers 70 against the front face of the air valve 46. The air valve 46 has already moved slightly in a leftward direction and this levering action will provide a positive force against the face of the air valve 46 proportional to the hydraulic pressure in the master cylinder above that required to overcome the force of the air valve spring 98 against the levers. Therefore, one operating the brake pedal 10 will have a "feel" during the operation just described and will therefore be apprised of the amount of pressure necessary to perform the desired braking. The relative position of the reaction levers is seen also in FIGURE 2.

It is clear, that, during the operation of the power boosting system described, a firm engagement is necessary at all times between the reaction retainer and the power piston as well as between the power piston and the diaphragm. Therefore, it is an intent of the present invention to provide such a firm engagement and that this engagement be made without the use of intricate assembly machinery at a time prior to final assembly.

The utility of the subject assembly is brought into clear focus when an analysis of the type of forces generated in such a power head are examined. It would be possible to use well-known connectors to establish a firm connection between the parts described. However, a non-rigid connection is desirable in view of the differential temperatures in which the booster assembly will be called upon to serve in its operative environment. Also, it is to be considered that the power booster, once assembled, should be relatively maintenance free and, at the same time, be practically foolproof in that the stopping of a vehicle depends on its trouble-free operation. During the cycle of operation, there will not always be exact axial alignment between the piston rod and the push rod and, therefore, stresses in a direction away from the axis through these rods will sometimes be encountered. These stresses will cause a certain amount of pressure on the connections between the parts previously described and, consequently, a non-rigid, yieldable connection therebetween is desirable.

It should also be understood that the intricate valving mechanisms generally found in an assembly of this type do not lend themselves to automated techniques during assembly. It is therefore desirable to completely assemble these power heads without the use of intricate assembly machinery after the initial valving has been assembled in a non-automated fashion. This invention obviates the problems hereinbefore described in that a very simple and yieldable connection is established between the various parts of an operative mechanism that requires a high degree of reliability in operation.

While the embodiment of the present invention, as herein disclosed, constitutes a preferred form, it is to be understood that other forms might be adopted.

What is claimed is as follows:

1. A power brake booster assembly for a power head comprising; a housing having a diaphragm therein separating said housing into two compartments, a power piston slidably disposed in one portion of said housing and engaging said diaphragm, a plurality of spaced stepped lugs formed on said power piston, said diaphragm being arranged to be moved along the axis of said power piston in response to a differential pressure on either side of said diaphragm, a reaction retainer carrying a push rod and engaging said power piston in a manner preventing relative movement therebetween, and a valve means adapted to be engaged by an actuator rod to allow the ingress of air thereby providing a differential pressure in said housing, said reaction retainer being arranged to move through one wall of said housing causing said carried push rod to energize a master cylinder, the engagement of said reaction retainer to said power piston comprising a plurality of retaining portions projecting from the outer periphery of said retainer circumferentially arranged therearound, a series of outwardly projecting portions on said power piston being spaced on one side of a transverse plane passing through the apex of said stepped lugs, and a split retaining ring arranged to engage said stepped outwardly projecting lugs at their apex and thereby holding surfaces of said outwardly projecting portions in firm engagement to said stepped lugs.

2. A power brake booster assembly for a power head comprising; a housing having a diaphragm therein separating said housing into two compartments, a power piston having a peripheral flange therearound and being slidably disposed through one wall of said housing, said diaphragm having a support member including a series of struck out retainers positioned in a circular fashion around the center of said support and engaging said peripheral flange of said power piston, said diaphragm being arranged to be moved along the axis of said power piston in response to differential pressures on opposite sides of said diaphragm, a reaction retainer engaging said power piston through an assembly comprising, a plurality of lugs having retaining portions thereon projecting outwardly from the center of said reaction retainer, a series of pockets in one surface of said power piston receiving said lugs to prevent relative rotary movement between said power piston and said reaction retainer, said power piston having a series of peripheral portions spaced on one side of a transverse plane passing through the center of the retaining portion of said lugs, and a split ring arranged to bear against said spaced peripheral portions and said retaining portion to hold said reaction retainer and power piston in operative engagement, the power head having a valve means adapted to be engaged by an actuator rod to allow the ingress of air thereby providing a differential pressure in the two compartments of said housing, said differential pressure driving a push rod carried by said reaction retainer.

3. A power brake assembly for a vehicle braking system comprising; a housing, a vacuum suspended diaphragm disposed within said housing, a reaction retainer carrying a push rod to a brake cylinder and being adapted for sliding movement through one wall of said housing, a power piston having a series of peripheral elements therearound adapted for sliding movement in another portion of said housing, and valve means engaged by an actuator rod and being adapted to meter atmospheric pressure and vacuum to one side of said diaphragm, said reaction retainer being held in operative engagement with said power piston by an assembly comprising, a series of outwardly projecting retaining means carried by said reaction retainer, a series of pockets in one portion of said power piston adapted to receive said outwardly projecting retaining means to prevent relative action movement therebetween, and a series of flanges formed as a portion of the power piston and spaced on one side of a plane defined by the center of said retaining means, and a split ring arranged to hold opposed faces of said retaining means and said flanges interlocked in a manner preventing relative movement therebetween and thereby preventing relative linear movement of said reaction retainer and said power piston, said diaphragm having a support member including a plurality of hooked projections arranged to engage said outwardly projecting flange of said power piston to hold said power piston and said diaphragm support member in operative engagement.

4. In a vacuum suspended power head for a vehicle power braking system, a retaining means for a reaction retainer and a power piston therein comprising; a plurality of retaining lugs having stepped portions thereon extending circumferentially from said reaction retainer, a series of pockets in one surface of said power piston adapted to receive said lugs to prevent relative axial movement between said power piston and said reaction retainer, said power piston having a series of peripheral flanges spaced on one side of a transverse plane passing through the apex of said stepped portions carried by said lugs, and a split ring disposed on said plane and being arranged to encompass said spaced peripheral flanges and engaging said stepped portions to hold said reaction retainer and said power piston against linear movement therebetween.

5. In an automobile power brake booster assembly including a power piston and a supported diaphragm therefor, a connecting means comprising; a support member for said diaphragm having a series of hooked projections extending from one portion thereof, and a series of lug elements including recesses formed in a portion thereof spaced around the outer periphery of said power piston and fixedly engaging said diaphragm support carried hooked projections to prevent rotational and axial movement therebetween.

6. A power head for a power brake booster having a vacuum suspended diaphragm therein comprising; a housing, a vacuum suspended diaphragm separating said housing into two compartments, a power piston operatively engaged with said diaphragm and being disposed for sliding movement through one wall of said housing in response to a differential pressure created in said compartments and a reaction retainer engaging said power piston and having a portion adapted for sliding movement through an opposite wall of said housing, said power piston and said reaction retainer being kept linearly and axially aligned by an assembly means comprising, a series of outwardly projecting retaining lugs carried by said reaction retainer, a series of pockets in one face of said power piston disposed in opposed juxtaposition to said retaining lugs and being adapted to receive said lugs, and a plurality of outwardly projecting flanges spaced on one side of a transverse plane defined by a retaining portion of said outwardly projecting lugs, and holding means arranged to encompass said spaced flanges and said outwardly projecting lugs disposed in said pockets thereby preventing any linear or axial movement between said opposed surfaces.

7. In a power braking system having a power head therein, a power wall assembly comprising; a reaction retainer engaging a power piston for axial movement within said power head, a valve means operatively associated with said power piston to selectively move said power wall in a reciprocative manner along the axis of said power head, an input rod disposed to move said valve means, and an output rod disposed for slidable movement in said reaction retainer, said power piston and said reaction retainer being engaged by a means comprising, a series of outwardly projecting lugs having holding portions thereon and being carried by said reaction retainer, an interrupted flange circumferentially mounted on said power piston, said flange having outwardly projecting portions disposed on one side of a transverse plane defined by the center of said lug carried holding portions, and a resilient ring arranged to encompass said flanges on said defined plane and being disposed to retain said circumferentially mounted lugs against said flanges thereby preventing linear and axial movement therebetween.

8. A securing means adapted to hold two opposite surfaces in engagement and against rotary or axial movement therebetween comprising; a series of outwardly projecting lugs having holding portions thereon and being carried by the outer periphery of one of said opposed surfaces, a series of pockets formed on the other of said opposed surfaces being arranged to receive said outwardly projecting lugs, a plurality of flanges spaced on one side of a transverse plane defined by said holding portions of said outwardly projecting lugs as said lugs repose in said pockets, and holding means arranged to bear against said spaced flanges and being disposed against said holding portions as said first opposed surface is in contact with said second opposed surface to hold said opposed surfaces in precise alignment againt a force tending to malalign said surfaces either rotationally or axially.

References Cited by the Examiner

UNITED STATES PATENTS

| | | | |
|---|---|---|---|
| 2,051,085 | 8/1936 | Ilseman | 64—8 |
| 2,092,704 | 9/1937 | Ricefield | 64—14 |
| 2,862,366 | 12/1958 | Ingres et al. | 91—376 |
| 2,972,983 | 2/1961 | Ayers | 91—369 |
| 3,082,745 | 3/1963 | Brooks | 91—376 |

FOREIGN PATENTS 642,314  3/1937  Germany.

SAMUEL LEVINE, *Primary Examiner.*

FRED E. ENGELTHALER, *Examiner.*

P. E. MASLOUSKY, *Assistant Examiner.*